United States Patent [19]

Stromswold et al.

[11] Patent Number: 5,343,207
[45] Date of Patent: Aug. 30, 1994

[54] REAL-TIME WIDE-BAND COMPRESSIVE-RECEIVER SYSTEM

[75] Inventors: Chester E. Stromswold, Nashua; John T. Apostolos, Merrimack, both of N.H.

[73] Assignee: Lockheed Sanders, Inc., Nashua, N.H.

[21] Appl. No.: 913,436

[22] Filed: Sep. 30, 1986

[51] Int. Cl.$^5$ .................... G01S 7/40; G01R 23/175
[52] U.S. Cl. .......................... 342/192; 342/20; 324/76.26; 324/76.35
[58] Field of Search .............. 455/226, 226.1; 324/77 B, 77 C, 77 CS, 76.26, 76.35; 342/13, 20, 192

[56] References Cited

U.S. PATENT DOCUMENTS

| | | | |
|---|---|---|---|
| 4,270,209 | 5/1981 | Albanese | 455/226 X |
| 4,649,392 | 3/1987 | Apostolos | 342/13 |
| 4,654,667 | 3/1987 | Apostolos et al. | 324/77 B X |

Primary Examiner—Gilberto Barron, Jr.
Attorney, Agent, or Firm—David W. Gomes

[57] ABSTRACT

The input ports (18) of an imaging compressive receiver (20) receive from a tapped delay line (16) progressively delayed versions of a received signal s(t). Because of the delays, a signal component in the received signal appears at least at one of the input ports (18) of the compressive receiver (20) at a time when the compressive receiver (20) will detect it, even if the undelayed version occurs during a time at which the compressive receiver (20) would ordinarily be insensitive to it. Since the compressive receiver (20) is an imaging device, it provides relatively isolated channels between its input terminals (18) and its output terminals (38). The phase relationships between the delays in these channels remain constant despite changes in environmental factors, however, because the various channels are embodied in a common two-dimensional delay line.

5 Claims, 3 Drawing Sheets

REAL-TIME WIDE-BAND COMPRESSIVE-RECEIVER SYSTEM

BACKGROUND OF THE INVENTION

The present invention is directed to radio receivers. It finds particular application in the type of radio receivers used for electromagnetic surveillance.

One type of radio receiver that is particularly effective in electromagnetic surveillance is the compressive receiver. A compressive receiver essentially performs a Fourier transformation on a band of input frequencies. It receives the band of input frequencies and repeatedly sweeps through the band. The output of the compressive receiver for a given-frequency input is a pulse of oscillations at the compressive-receiver center frequency. The time during the compressive-receiver sweep at which the pulse occurs represents the frequency of the input signal that gave rise to it. Accordingly, one can determine the frequencies at which transmissions are occuring by noting the times at which pulses occur in the compressive-receiver output. Conventional superheterodyne receivers can then be tuned to the frequencies indicated by the times at which the pulses occur, and the contents of all transmissions in the frequency band of interest can be monitored.

Although this arrangement is quite effective, it has features in which improvement may be desired. For example, an electromagnetic spectrum densely populated with transmissions requires a large number of superheterodyne receivers to provide complete monitoring of all the transmissions. This can result in a bulky, expensive surveillance apparatus.

In theory, the separate superheterodyne receivers are not needed; the pulses at the output of the compressive receiver retain phase and amplitude information. Consequently, if one produced output pulses for a frequency band of interest at a rate at least as high as the Nyquist rate for that band, a bandpass filter having the center frequency of the compressive-receiver delay line and the bandwith of the band of interest could convert the pulses to a frequency-translated version of the signal component within that band. This band could then be readily demodulated or otherwise processed in any desired manner.

Previously proposed schemes for achieving such a result, however, present certain practical problems. In order to obtain 100% time coverage of the received signals and to provide samples at a rate consistent with the resolution of the compressive receiver, its frequency range had to be restricted considerably, to less than the bandwidth of the dispresive delay lines that it employs. To obtain a wider bandwidth, it was proposed to use several parallel compressive receivers with frequency ranges wider than the bandwidths of their dispersive delay lines. The compressive receivers would have sweeps successively staggered in time, and the outputs of compressive receivers with successive sweeps would be the successive samples for the subsequent reconstruction of the received signal component. In this arrangement, the "dead" time of each receiver—which dead time is an inevitable result when a compressive receiver has a frequency range wider than the bandwidth of its delay line—is covered by one or more of the other receivers so that together the receivers provide 100% time coverage.

Although this arrangement theoretically produces the desired result of 100% time coverage in a wide-band receiver, it presents a practical problem of its own. Since information is contained in the phases of the output pulses, the phase shifts in the several compressive receivers have to track each other, and it is quite difficult to provide compensation circuitry with the ability to maintain the required degree of phase tracking.

It is accordingly an object of the present invention to monitor a frequency in which a compressive receiver has detected a transmission but to avoid having to use a separate superheterodyne receiver for each detected frequency.

It is another object of the present invention to enable a wide-band compressive receiver to eliminate dead periods for all frequencies within its frequency range.

It is a further object of the present invention to provide an improved compressive-receiver surveillance system.

SUMMARY OF THE INVENTION

The foregoing and related objects are achieved in an apparatus that introduces several differently-delayed versions of a received signal into an imaging two-dimensional compressive receiver that compresses the several delayed versions simultaneously in the same two-dimensional delay line. The several versions propagate through substantially the same delay medium, so their delays and phase shifts track.

For instance, a device such as a tapped non-dispersive delay line can delay the detected signal by a plurality of different delays so as to produce a plurality of delayed signals from it. The different delays are preferably successive multiples of the period of a sampling frequency high enough to extract all of the information contained in a relatively narrow frequency band of a predetermined width, such as a width equal to the resolution of the compressive receiver.

The compressive receiver chirp-translates the various delayed signals and applies the results to different input ports of its imaging two-dimensional linear dispersive delay line. The signals introduced into the two-dimensional delay line are superimposed through large parts of the paths that they take in propagating through the delay line, but the geometry of an imaging delay line is such that they again become separated by the time they reach the delay-line output ports, which are disposed at the image points of respective ones of the delay-line input ports.

Because of the relationship of the chirp rate to the delay function of the dispersive delay line, all outputs of the dispersive delay line that result from a given detected-signal frequency component during a given sweep occur as simultaneous short-duration pulses at the various output ports of the dispersive delay line. As a result, an ensemble of simultaneously occurring outputs represents the amplitude and phase of successive (but typically overlapping) samples of a detected-signal frequency component whose frequency is indicated by the time of occurrence of the outputs within the sweep. The sampling frequency is the reciprocal of the delay increments between successive taps in the tapped delay line. The individual signals in the ensemble can then be combined or otherwise processed in accordance with the delays of the delayed signals that caused them, and the signal in the narrow frequency band represented by the ensemble can thereby be reconstructed.

If the tapped delay line produces enough outputs to span the sweep period of the compressive receiver, the system has no dead periods. Furthermore, the delays and phase shifts experienced by the various signals in traveling through the dispersive delay line track naturally because of their common delay medium. Therefore, no complicated arrangements need to be made to compensate for environmental factors.

BRIEF DESCRIPTION OF THE DRAWINGS

These and further features and advantages of the present invention are described in connection with the accompanying drawings, in which.

DETAILED DESCRIPTION OF ILLUSTRATIVE EMBODIMENTS

Figure 1:
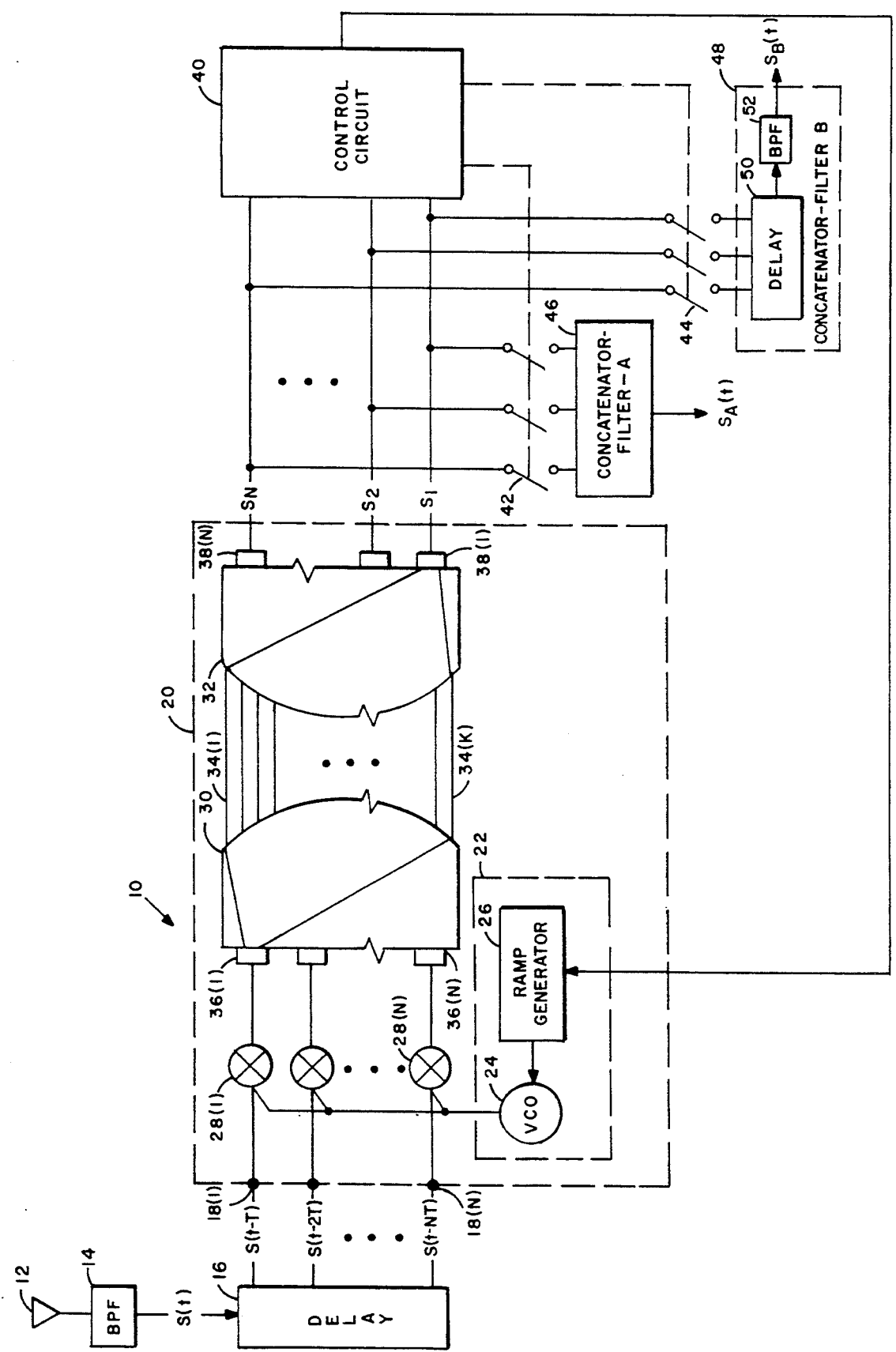
FIG. 1 is a block diagram of one embodiment of the present invention.

FIG. 1 shows a compressive-receiver system 10 in which an antenna 12 detects a broadcast signal, which is band-pass limited in a band-pass filter 14. Filter 14 has a relatively wide pass band of, say, 60 MHz. The band-pass filter 14 sends its output s(t) to a tapped non-dispersive delay line 16, which provides N outputs s(t-T) ... s(t-NT). That is, each output is the detected signal delayed by a different multiple of T, which is the reciprocal of a desired sampling frequency. The sampling rate should be at least as high as the Nyquist rate for the bandwidth of a single one of the frequency "bins" into which the 60-MHz band is to be divided for monitoring.

The outputs of the tapped delay line 16 are supplied to the input ports 18(1)–18(N) of an imaging two-dimensional compressive receiver 20. The compressive receiver includes a chirped local oscillator 22, which is depicted conceptually as simply a voltage-controlled oscillator 24 controlled by a ramp signal from a ramp generator 26. The chirped local oscillator feeds its output to a plurality of frequency translators 28(1)–28(N). Each of these frequency translators 28 translates its input signal in frequency by the frequency of the output of the chirped local oscillator 22. The local-oscillator frequency sweeps repetitively through a predetermined frequency range, the frequency within a sweep being a linear function of time. While the frequency translators 28 are depicted simply as multipliers, those skilled in the art will recognize that they include filters for eliminating undesired sidebands and for weighting the amplitude as a function of frequency to reduce sidelobes in the outputs of circuitry that follows.

The circuitry that follows is an imaging two-dimensional dispersive delay line comprising two focusing two-dimensional dispersive delay lines 30 and 32 joined by connecting transducers 34(1)–34(K). Delay line 30 includes a plurality of input ports 36(1)–36(N). The delay-line signal resulting from input port 36(1) is depicted as spreading out to cover much of delay line 30 so that it is received by all of the connecting transducers 34(1)–34(K). The connecting transducers 34 also receive components from all of the other ports 36.

However, the delay lines are arranged so that there is an image point for each input port. That is, although the signal from a given input port spreads out and is superimposed on the signals from the other input ports as it travels through delay lines 30 and 32, it becomes refocused at a point in delay line 32 that is an "image" of the point at which that signal was introduced at an input port 36. Output ports 38(1)–38(N) are provided at these image points, so the signal received by an output port 38 results almost exclusively from the signal at its corresponding input port 36; it has almost no contribution from any of the other input ports 36.

In effect, the imaging delay line thus provides a plurality of parallel channels, but these channels all include the same delay medium, namely, the bodies of the two dispersive delay lines 30 and 32. The effects of changes in factors such as temperature and humidity, which can affect the phase relationships between the input signals and the output signals, are thus the same for all of the channels. As a result, phase tracking among the channels results naturally without elaborate compensation networks and matching procedures.

Two-dimensional delay lines 30 and 32 form a composite delay line whose delay as a function of frequency has the usual compressive-receiver relationship to the chirp rate of the local oscillator 22; the relationship is such that a continuous-wave narrow-band component of s(t) results in only a very short-duration pulse at the output terminals 38. The reason for this is that a narrow-band component is translated at later parts of the sweep to frequencies that are delayed less by the delay lines 30 and 32 than are the frequencies to which that component is translated earlier in the sweep. The delay-line signals that the component causes later in the sweep catch up at the output ports to the signals that the component causes earlier in the sweep, so the entire duration of the narrow-band component results in only a very short-duration pulse at ports 38. The time during the sweep at which an output pulse occurs is an indication of the frequency of the s(t) component that gave rise to it; a compressive receiver can thus be thought of as a device for performing a Fourier transformation.

The outputs $S_1, S_2, \ldots, S_N$ at the output terminals 38 consist largely of pulsed oscillations of the delay-line center frequency. If a pulse occurs in one of the outputs $S_n$, a pulse usually, but not invariably, occurs in all of the other outputs at the same time, though not with the same phase and amplitude. This is a result of the fact that a given-frequency component in s(t) typically, but not always, lasts throughout a given sweep, but its amplitude and phase change.

FIG. 1 shows a control circuit 40, which controls the oscillator 22 so as to control its phase and the relationship between time and frequency. The control circuit 40 also receives all the outputs $S_n$, monitoring them to determine, on the basis of the times of occurrence of the various pulses, which frequency bands contain transmissions. On the basis of this information, it controls banks of sampling switches 42 and 44. Typically, multiplexers equivalent to more than two banks of switches would be used, but only two banks are shown for the sake of simplicity.

When the control circuit 40 detects a pulse at a given time during a sweep, it closes one of the switch banks 42 and 44 for a short duration at corresponding times during subsequent sweeps, when similar pulses can be expected. If pulses occur at two times during a sweep, the control circuit 40 operates the second bank of switches 44 in a similar manner. In this way, the first bank of switches 42 applies the outputs $S_n$ to a concatenator-filter 46 for a short period at one time during the sweep at which pulses are expected, and switch bank 44 applies the outputs $S_n$ to another concatenator-filter 48 at another time during the sweep at which pulses are expected.

Concatenator-filter 48, to which concatenator-filter 46 is identical, is depicted in FIG. 1 as including a non-dispersive tapped delay line 50. Delay line 50 receives signals $S_n$ at successive taps in accordance with the delays in s(t) of the input signals that produce them. The delays of delay line 50 are the same as those of delay line 16. This effectively concatenates the signals $S_n$ in time, and the resultant signal is fed to a narrow-band filter 52, whose center frequency is the center frequency of the delay line but whose bandwidth is typically much narrower; it is narrow enough that the delay increment of the delay lines 16 and 50 is the period of a frequency greater than the Nyquist rate for that bandwidth. The output $s_B(t)$ of the narrow-band filter 52 is thus a frequency band in s(t) determined by the time within a sweep during which switch bank 44 was closed but translated in frequency to the center frequency of the dispersive delay lines 30 and 32. This output $s_B(t)$ can then be demodulated or otherwise processed in any desired manner.

Those skilled in the art will recognize that the arrangement of FIG. 1 can be modified significantly without departing from the basic principles of the present invention. For example, the two delay lines 16 and 50 can be eliminated and replaced with an equivalent element interposed between the oscillator 22 and the frequency translators 28. Specifically, if each mixer received a differently delayed version of the chirp signal, all of the mixers could receive the same s(t) signal. Since the output signals $S_n$ for the same frequency would be displaced in time, there would be no need for the other delay line 50, but the switches in the switch bank 44 would have to be closed at successive times rather than simultaneously.

Figure 2:
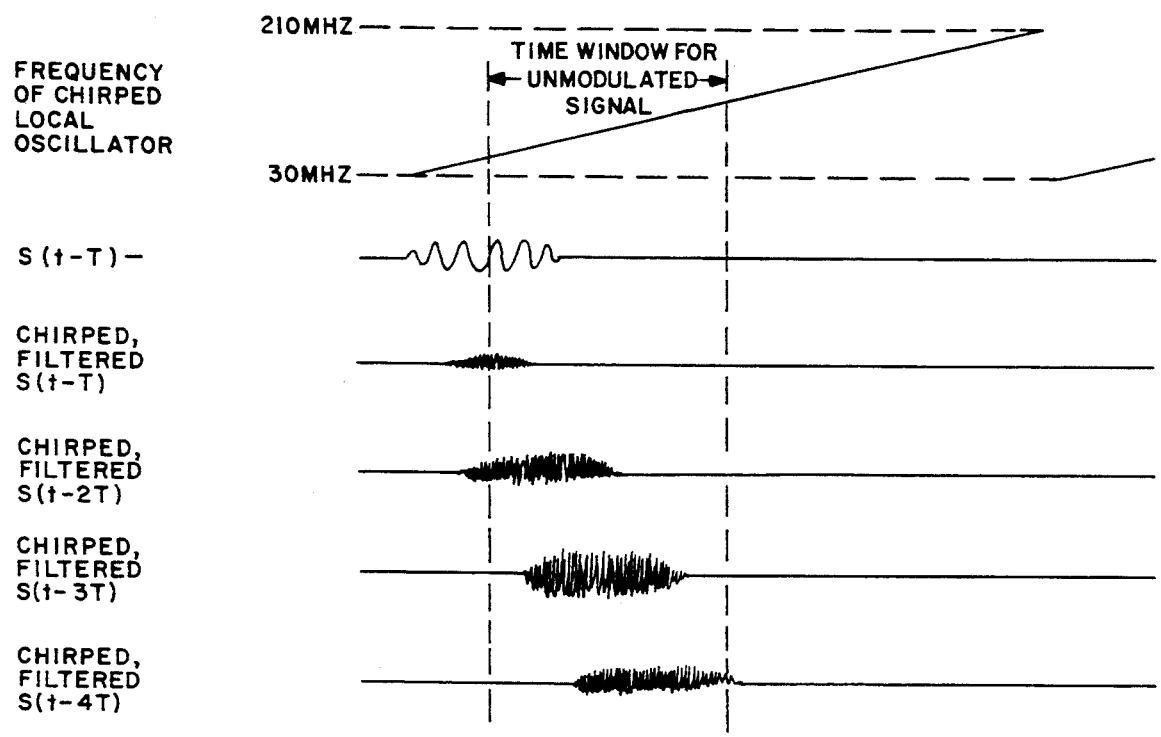
FIG. 2 is a time diagram depicting, as functions of time, the uncompressed chirp signals produced by the apparatus of FIG. 1 and the translation frequencies by which they are produced.

FIG. 2 is a plot of various quantities and signals in the system. It illustrates the principle of operation of the invention.

The first plot represents the frequency by which the frequency translators 28 translate their input signals. At the beginning of the sweep, the frequency translation is 30 MHz, and it increases linearly to 210 MHz within a span of 180 microseconds; that is, the chirp rate is 1 MHz/usec.

The delay-line bandwidth is assumed to be 60 MHz; that is, the frequency band over which the delay-versus-frequency function is linear is 60 MHz wide, and the weighting filters in the frequency translators 28 admit only frequencies within this band into the delay line. It is also assumed that the compressive receiver has a frequency resolution of 30 kHz; that is, equal-amplitude continuous-wave received signals 30 kHz apart will result in pulses in the compressive-receiver output that can be resolved. Accordingly, it is desired to monitor bands that are 30 kHz wide. To extract all of the information from a band 30 kHz wide, the band must be sampled at least at its Nyquist rate of 60 kHz, i.e., at least once every 17 microseconds. The relative delays between successive outputs of the tapped delay line 16 are 15 microseconds, so the input signal is sampled at a frequency above the Nyquist rate.

In the present example, we assume that s(t) is a short-duration (highly amplitude-modulated) signal of a particular frequency. We further assume that if s(t) were a continuous, unmodulated (i.e., narrow-band) signal having this frequency, its chirped version would be present only during a time window between 15 microseconds and 75 microseconds after the beginning of the sweep. Since s(t-T) is highly modulated, however, it results in a chirped signal that begins shortly after the start of the sweep, i.e., before an unmodulated signal of the same frequency would. As the second line of FIG. 2 shows, half of the significant amplitude of s(t-T) occurs outside of this period, so it results in only a small-amplitude chirp signal, as the third line shows. In light of the small amplitude of its chirp signal, if s(t-T) were the only input to the compressive receiver, the received signal s(t) would not be easily detected. According to the present invention, however, several delayed versions are applied to the compressive receiver so that the entire content of the sweep period is processed simultaneously during that portion of the sweep period in which it is more readily detected.

Specifically, the second delayed version, s(t-2T), begins 5 microseconds before the beginning of the time window and ends 15 microseconds before the time window ends. It therefore results in a chirped signal whose amplitude is significantly higher than that of the chirp signal caused by s(t-T).

The next delay value, s(t-3T), results in an even higher-amplitude chirped signal, as the fifth line indicates, because s(t-3T) is centered in the time window, starting 10 microseconds after the beginning of the window, and ending 10 microseconds before its end.

Finally, s(t-4T) extends from 25 microseconds into the window to 5 microseconds after the window ends to cause a smaller-amplitude chirped output. The other eight chirp inputs to the dispension delay line are all as low or lower in amplitude than that which results from s(t-T).

Figure 3:
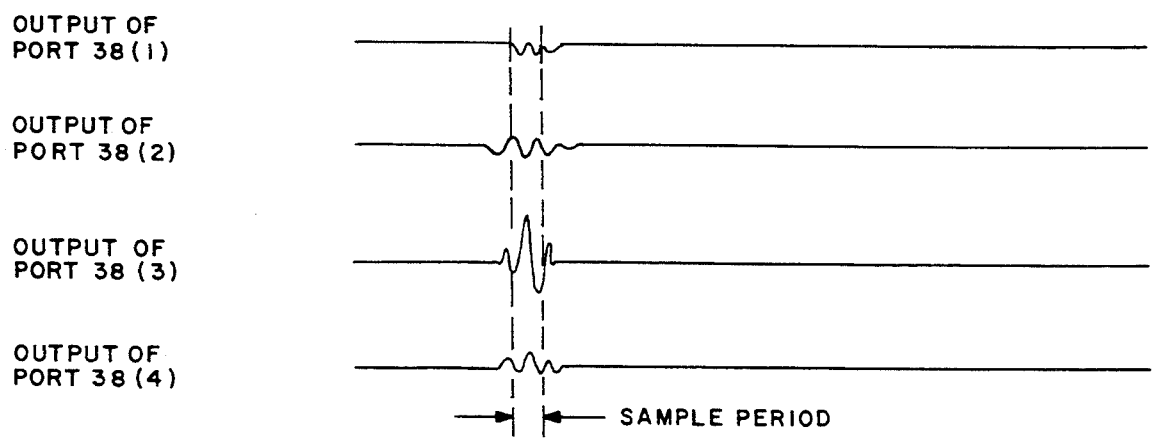
FIG. 3 is a time diagram of the compressed chirp signals that the apparatus of FIG. 1 produces.

The results of these chirped signals at the output ports 38 of the compressive receiver are depicted in FIG. 3, which has a time scale greatly expanded from that of FIG. 2. FIG. 3 shows the four output signals in the neighborhood of a sample period for which the system monitors the compressive-receiver outputs for the 30-kHz-wide frequency band about the nominal frequency of the oscillations in s(t). FIG. 3 shows that, although all of the delayed signals occur at different times within the sweep, their chirp-signal results all occur in a neighborhood of the sampling interval, but with different phases and amplitude, and they all result in longer-duration pulses than unmodulated signals of the same instantaneous frequency would.

Figure 4:
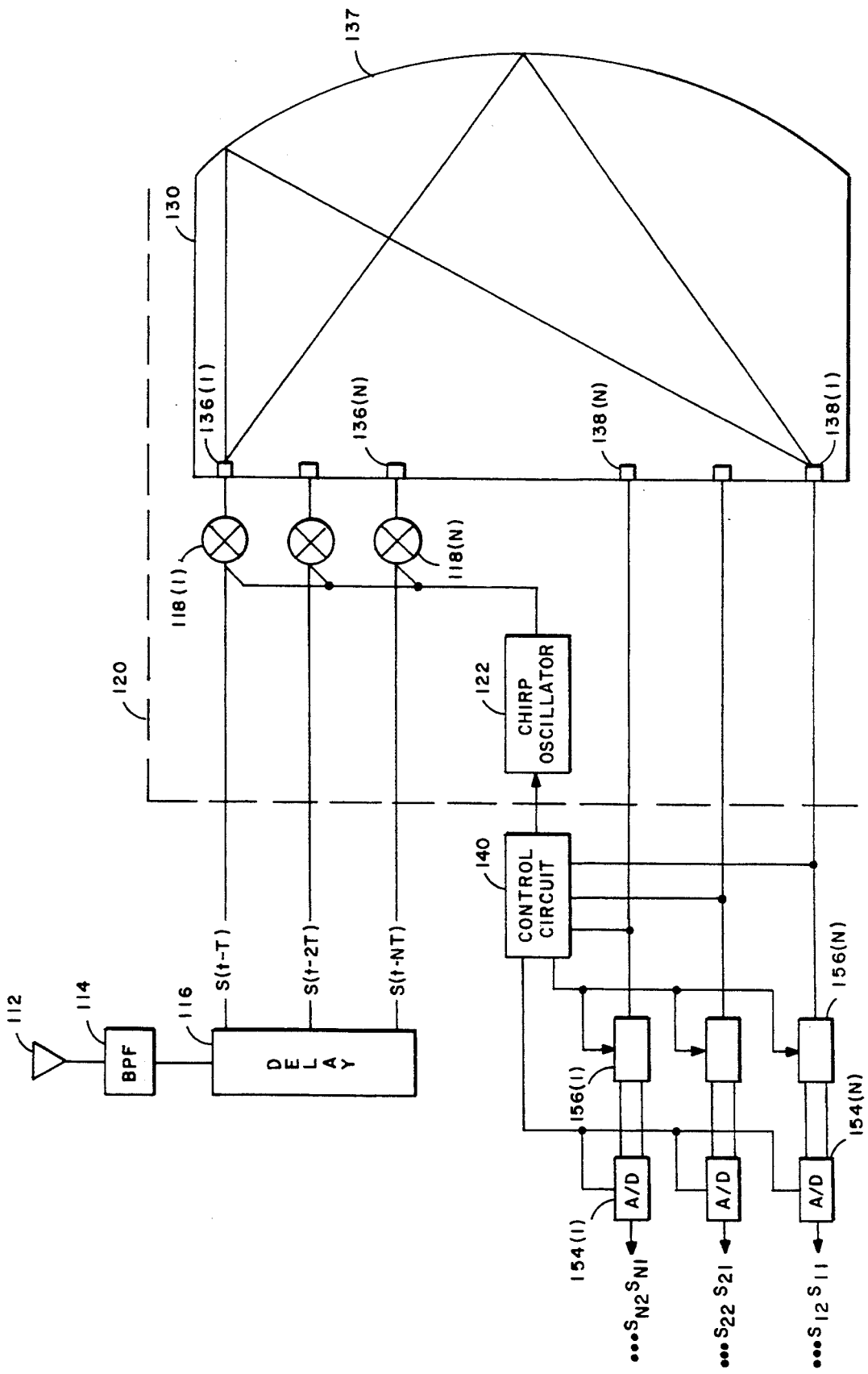
FIG. 4 is a block diagram of another embodiment of the present invention.

FIG. 4 depicts an apparatus similar to that of FIG. 1, but one that employs a somewhat different imaging delay line and that performs the output sampling digitally. In FIG. 4, the antenna 112, filter 114, tapped delay line 116, frequency translators 118, and local oscillator 122 all perform functions essentially the same as those performed by corresponding elements 12, 14, 16, 18, and 22 of FIG. 1. However, the compressive receiver 120, although performing a function the same as that performed by the compressive receiver 20 of FIG. 1, includes a different type of imaging delay line 130.

In this delay line, signals are introduced at input ports 136(1)–136(N) along one edge, propagate along the length of the delay line 130 to a reflecting edge 137 at the other end of the delay line 130, and are reflected back to output ports 138(1)–138(N) on the edge occupied by the input ports 136. The shapes and distances are such that the signal from input port 136(1), although spreading out in its propagation toward edge 137 and thereby having its path superimposed on those of the signals introduced by the other input terminals 136, is refocused by the time it returns to the edge containing the output ports so that it is detected by output port 138(1) to the exclusion of the other output ports 138. Similar behavior obtains for all of the input and output terminals; each output terminal 138 receives the signal introduced by its corresponding input terminal 136 but receives essentially no signal from any of the other input terminals 136.

Like the control circuit 40 of FIG. 1, control circuit 140 of FIG. 4 monitors the outputs of output terminals 138 to determine the times within the receiver sweeps at which pulses occur and thus to determine what frequency components the received signal s(t) contains. However, rather than control the operation of switch banks in accordance with these times, the control circuit 140 controls the times of occurrence of the time windows that analog-to-digital converters 154(1)–154(N) use in converting their analog-signal inputs to digital-signal outputs. The inputs to these analog-to-digital converters are produced by amplitude-retaining (i.e., in-phase/quadrature) phase detectors 156(1)–156(N). These phase detectors receive the outputs of the imaging dispersive delay line 130 and compare their phases with the phase of a fixed-frequency reference signal generated by the control circuit 140. The frequency of this reference signal is the center frequency of the dispersive delay line 130. Additionally, this reference signal is a harmonic of another reference signal, one that the control circuit applies to the chirped local oscillator 122. Oscillator 122 uses this second reference signal in accordance with conventional sandap operation to maintain the linearity of its frequency-versus-time relationship and insure that its output phases at corresponding times in successive sweeps are the same. Because of this harmonic relationship, the phase detectors 156 are in synchronism with the compressive receiver 120.

Each phase detector 156 divides its input signal into in-phase and quadrature components and supplies these two components to its associated analog-to-digital converter 154. During each time window designated by control signals from the control circuit 140, each digital-to-analog converter performs two simultaneous conversions of the analog signal levels present at its two input terminals. The resultant output of each analog-to-digital converter 154(n) is a string of complex values $s_{1n}$, $s_{2n}$, .... Each value represents the amplitude and phase of the nth sample during that sweep of a different frequency component of the received signal s(t). The simultaneous values $s_{n1}$, $s_{n2}$, ..., $s_{Nn}$ constitute the complex samples of a single frequency component for one complete sweep. These values can be processed in any desired manner.

From the foregoing description, it is apparent that the system of the present invention can be arranged to provide 100% time coverage of signals detected by a compressive receiver without the need for separate super-heterodyne receivers even when the compressive-receiver delay line has a bandwidth narrower than that of the compressive receiver. This result is achieved without using complicated compensating networks to insure proper phase relationships; phase tracking results naturally because the signals for all of the channels propagate through the same two-dimensional dispersive delay line. Accordingly, the present invention represents a significant advance in the art.

What is claimed as new and desired to be secured by Letters Patent of the United States is:

1. For individually monitoring narrow-band components in a wide-band signal, an apparatus comprising:
   A. an imaging two-dimensional dispersive delay line having delay-line input ports disposed at different physical locations on the two-dimensional dispersive delay line and having a delay-line output port associated with each delay-line input port and disposed at the image point of the delay-line input associated therewith so that signals introduced at a given delay-line input port are received at the delay-line output port associated therewith substantially to the exclusion of the other output ports; and
   B. frequency-translation means, operating in successive sweeps, for generating from a received signal a plurality of chirped signals, each chirped signal being associated with a different one of the input ports, and for applying each chirped signal to its associated input port, each chirped signal being a progressively frequency-translated version of a time segment of the received signal within each sweep, the beginning of which time segment is offset in time from those of the time segments of which the other chirped signals are frequency-translated versions, the progressive frequency translation of each signal segment being so related to the dispersion of the dispersive delay line as to cause the components in the chirped signals caused by narrow-band signals in the wide-band signal to be compressed in propagating between the input and output ports of the dispersive delay line so that the frequency of a narrow-band component of the wide-band signal is indicated by the times of the occurrences at the output ports of the compressed versions that that component causes, whereby the outputs of successive output ports at times that indicate a given frequency represent compressed versions of progressively delayed segments of a narrow-band component of the wide-band signal having the frequency associated with the given time so that all of the information in the narrow-band component can be extracted if the time increments between the beginnings of the signal segments are less than or equal to the Nyquist rate for the width of the narrow-band component and enough ports and chirped signals are provided to span the sweep time of the means for generating chirped signals.

2. An apparatus as defined in claim 1 wherein the frequency-translation means includes:
   A. means for generating from the wide-band signal a plurality of delayed signals, each of the delayed signals being a delayed version of the wideband signal delayed therefrom by a different delay interval; and
   B. means for generating the chirped signals from the delayed signals by progressively frequency-translating all of the delayed signals simultaneously by the same frequency translation as a function of time.

3. An apparatus as defined in claim 1 wherein:
   A. the dispersive delay line has an output frequency-resolution limit; and
   B. the time offsets between the time segments from which the chirp signals are generated are substantially less than or equal to the Nyquist rate for the output frequency-resolution limit of the dispersive delay line.

4. An apparatus as defined in claim 1 further including:
A. means for generating an ensemble of sample signals by sampling the outputs of the dispersive-delay-line ports at times indicating the same input frequency;
B. means for generating a concatenated signal by concatenating the sample signals of the ensemble in accordance with the times of occurrence of the beginnings of the time segments from which the outputs resulted;
C. means for filtering the concatenated signal by extracting therefrom a band of frequencies whose bandwidth is less or equal to half the reciprocal of the time difference between successive time segments.

5. An apparatus as defined in claim 1 in which the dispersive delay line has a reflecting edge and the input and output ports are so positioned with respect to each other that signals introduced into the dispersive delay line at one of the input ports is reflected off the reflecting edge in propagating from the input port to the output port.

* * * * *

UNITED STATES PATENT AND TRADEMARK OFFICE
CERTIFICATE OF CORRECTION

PATENT NO. : 5,643,207
DATED : July 1, 1997
INVENTOR(S) : Mark T. Rise

It is certified that error appears in the above-identified patent and that said Letters Patent is hereby corrected as shown below:

Col. 6, Line 31    "pump:" should be " pump;"

Col. 5, Line 19    "he" should be "the"

Col. 5, Line 58    "of;" should be "of:"

Signed and Sealed this

Twenty-second Day of September, 1998

Attest:

BRUCE LEHMAN

Attesting Officer    Commissioner of Patents and Trademarks